March 2, 1965 D. E. ALTMAN 3,172,043

SIGNAL DELAY UTILIZING PLURALITY OF SAMPLERS EACH COMPRISING SWITCH, AMPLIFIER, AND STORAGE ELEMENT CONNECTED SERIALLY

Filed Dec. 11, 1961 4 Sheets-Sheet 1

INVENTOR
DANIEL E. ALTMAN

BY

Paul A. Critchlow
ATTORNEYS

INVENTOR.
DANIEL E. ALTMAN
BY
ATTORNEYS

INVENTOR
DANIEL E. ALTMAN
BY
Paul W. Critchlow
ATTORNEYS

INVENTOR.
DANIEL E. ALTMAN
BY
[signature]
ATTORNEYS

United States Patent Office 3,172,043

Patented Mar. 2, 1965

3,172,043
SIGNAL DELAY UTILIZING PLURALITY OF SAMPLERS EACH COMPRISING SWITCH, AMPLIFIER, AND STORAGE ELEMENT CONNECTED SERIALLY

Daniel E. Altman, San Diego, Calif., assignor to the United States of America as represented by the Secretary of the Navy Filed Dec. 11, 1961, Ser. No. 158,619
12 Claims. (Cl. 328—55)
(Granted under Title 35, U.S. Code (1952), sec. 266)

The invention described herein may be manufactured and used by or for the Government of the United States of America for governmental purposes without the payment of any royalties thereon or therefor.

The present invention relates to signal delaying apparatus.

Passive electrical delay lines of the lumped-constant line variety and distributed-constant line variety have amplitude and phase distortion as well as a low time-delay signal bandwidth product.

Attempts have been made to delay signals with the aid of a binary shift register. The signal to be delayed is first sampled periodically and then the samples are classified according to whether their amplitude is above or below an arbitrary reference level resulting in binary-coded signals. The binary-coded signals are then transferred to a binary shift register and passed through at the desired rate. This method of signal delay is very unsatisfactory since it divests the signal of a large part of its amplitude information.

It is an object of this invention to provide a signal delaying apparatus with improved time-delay signal bandwidth product.

It is an object of this invention to provide a signal delay device which accurately preserves the amplitude information of the incoming signal.

It is another object of this invention to provide a signal delaying apparatus that will readily accommodate high-frequency signals. Other objects and advantages of the invention will be apparent from a study of the following specifications read in connection with the accompanying drawings, wherein.

Figure 5:
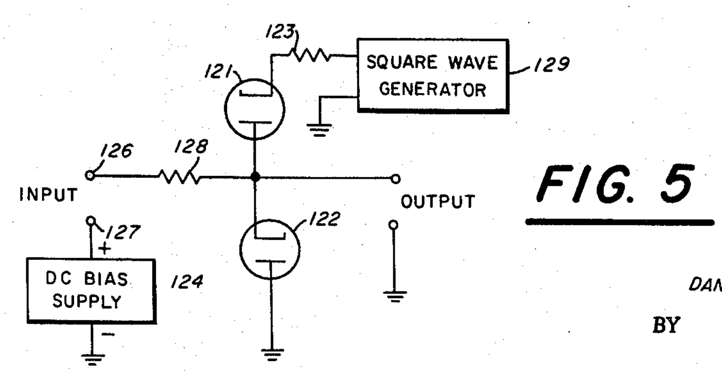
FIG. 5 illustrates a diode switch.
Figure 10:
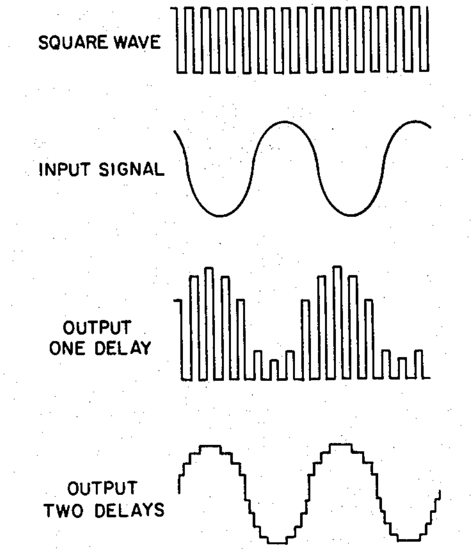

FIGS. 6–9 schematically show signal delay apparatus employing switches in accordance with that of FIG. 5; and FIG. 10 illustrates exemplary waveforms of apparatus in accordance with the invention.

It is well known that if a complex wave is sampled at a frequency exceeding twice that of its highest frequency component, the samples will contain all of the information in the original wave, and that it can be reconstructed from them. If one of the samples is used to charge a capacitor, it may, if the capacitor leakage is sufficiently small, be recovered at a later time with negligible loss. Thus, a complex wave may be stored, and delayed in time, by sampling it, and storing each sample in a separate capacitor. The length of time the sample may be stored, for a given amplitude loss, depends on the time constant of the capacitor leakage resistance combination, while the length of wave that can be stored is the product of the period of the sampling frequency and the number of capacitors available.

Figures 1, 2:
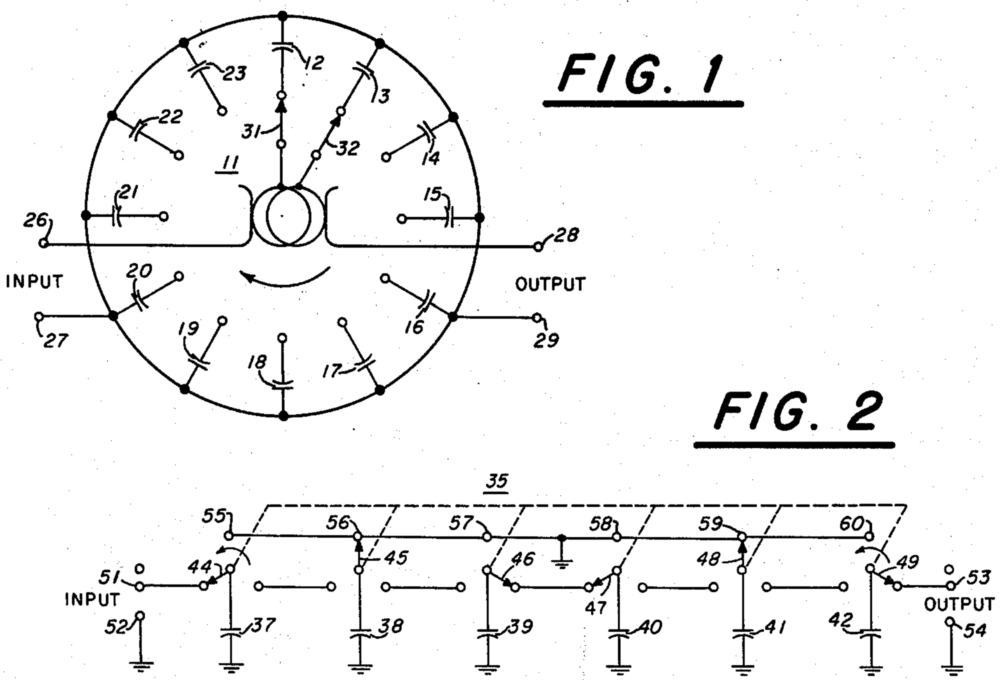
FIGS. 1–4 illustrate signal delay apparatus employing mechanical switches.

FIG. 1 shows signal delaying apparatus that utilizes the above-mentioned sampling-storing technique. Two-pole rotary switch 11 is rotated in a clockwise direction by rotating means (not shown). Capacitors 12–23 are respectively connected to the twelve stationary contacts of switch 11. Input terminal 27 and output terminal 29 are in common with each other and one electrode of each capacitor. Input terminal 26 is connected to rotating contact 31 and output terminal 28 is connected to rotating contact 32. The length of a signal sampling period is controlled by the time contact 31 dwells on a stationary contact. Input signals imposed across the capacitors by means of rotating contact 31 are stored by the capacitors and later retrieved by contact 32. The signal delay time is controlled by the rotation speed of the switch and may be varied as desired.

The apparatus in FIG. 2 is equipped with a six-pole, three-position rotary switch 35. The switch is rotated in a counter-clockwise direction by rotating means (not shown). Capacitors 37–42 are connected to rotating contacts 44–49, respectively. One electrode of each capacitor is grounded as are terminals 52, 54 and 55–60. In operation the rotary switch 35 first connects capacitor 37 to the signal source at input terminals 51 and 52, then to capacitor 38 which then becomes charged to one-half the signal voltage. The switch then connects capacitor 37 to ground causing the capacitor to discharge preparatory to receiving the next signal sample. Thus, as the switch rotates, signal samples are passed left-to-right from capacitor to capacitor, being attenuated by one-half each time they are transferred.

Figure 3:
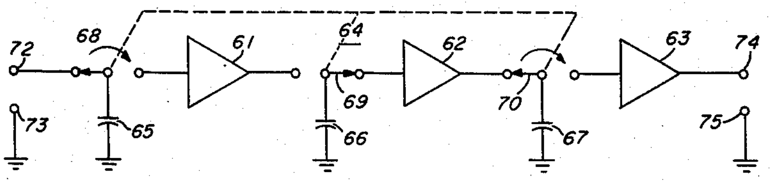

The apparatus illustrated in FIG. 3 is equipped with unity-gain amplifiers 61–63 having a high input impedance and low output impedance. A three-pole, two-position rotary switch 64 is rotated in a clockwise direction by rotating means (not shown). Capacitors 65–67 are connected to rotating contacts 68–70. In operation, a signal to be delayed is impressed across input terminals 72 and 73. As switch 64 rotates, samples of the input signal are transferred from one capacitor to another. The delayed signal is removed at output terminals 74 and 75. The low output impedance of the amplifiers causes the storage capacitors to be quickly charged to a new voltage level, regardless of whether the new level is above or below that left by the previous sample. The amplifiers isolate adjacent capacitors and enable a capacitor to be charged without discharging the preceding capacitor. Thus, the disadvantage of the apparatus in FIG. 2, the attenuation of the signal by a factor of two each time the signal sample is transferred, is not duplicated in the apparatus of FIG. 3.

Figure 4:
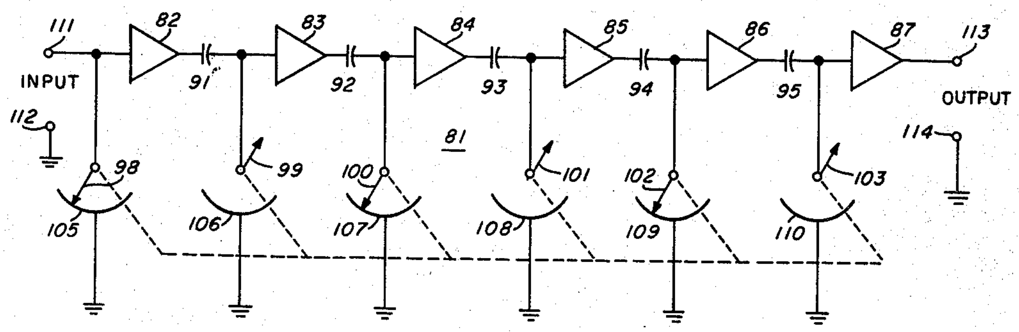

The isolation or buffer amplifiers 82–87 illustrated in FIG. 4 have the same characteristics as the amplifier shown in FIG. 3, a high input impedance and a low output impedance. Capacitors 91–95 are connected to the outputs of amplifiers 82–86, respectively. The rotary contacts 98–103 of six-pole rotary switch 81 are connected to the inputs of amplifiers 82–87, respectively. The rotary contacts are continuously rotated in a clockwise direction by rotating means (not shown). Rotary contacts 99, 101 and 103 are ganged in such a way that they are displaced 180° from rotary contacts 98, 100 and 102. As a general rule, when rotary contacts 98, 100 and 102 engage stationary contacts 105, 107 and 109, respectively, rotary contacts 99, 101 and 103 do not engage stationary contacts 106, 108 and 110, respectively. The stator segments 105 to 110 of switch 81 define an arc slightly less than 180 degrees so that no two adjacent switches are closed simultaneously. This preserves the charges on capacitors 91 to 95. In operation, a signal to be delayed is impressed across input terminals 111 and 112. When contacts 98 and 105 are open, and contacts 99 and 106 are closed, amplifier 82 enables capacitor 91 to charge to the signal voltage on the input terminal at that time. Assume, for example, that the voltage at that time is +E. Contacts 99 and 106 then open and the pairs of switch contacts on each side of these contacts close. The closing of contacts 98 and 105 in effect grounds the left terminal of capacitor 91. This closing along with the simultaneous closing of contacts 100 and 107 causes a voltage −E to appear across the terminals of capacitor 92 and the capacitor charges to that voltage. Then contacts 100 and 107 open and the pairs of contacts on each side of these contacts close. The closing of contacts 99 and 106 in effect grounds the left end of capacitor 92 causing +E volts to appear between the right terminal of capacitor 92 and ground. As the switch continues to rotate the voltage sample is shifted from capacitor to capacitor until it reaches output terminals 113 and 114.

The switches disclosed in FIGS. 1–4 are of the mechanical type. FIG. 5 illustrates a non-mechanical switch employing diodes 121 and 122. The diodes are series connected with the anode of diode 122 grounded and the cathode of diode 121 connected to resistor 123. A D.-C. bias supply 124 is connected between ground and input terminal 127. The bias voltage is sufficient that a signal applied between input terminals 126 and 127 is never negative with respect to ground. Resistor 128 is connected between input terminal 126 and the junction of diodes 121 and 122. A square-wave signal is fed to resistor 123 from square-wave generator 129.

In operation, the square-wave voltage from generator 129 functions to key the diodes. When the square-wave voltage is more positive than the sum of the bias voltage and the signal applied to input terminals 126 and 127, the diodes are reversed biased and the resistance of the diodes is very high. The resistance ratio between resistors 123 and 128 is such that, when the square-wave voltage is negative with respect to ground, there is more electron flow through resistor 123 than through resistor 128. Resistor 128 and diode 122 form a voltage divider. As the forward resistance of diode 122 is negligible compared to the resistance of 128, nearly all of the input signal appears across resistor 128. So diode 122 in effect functions as a single-pole, single-throw switch closing when the square-wave voltage swings in the negative direction and opening when the square-wave voltage is more positive than the input signal voltage.

Figure 6:
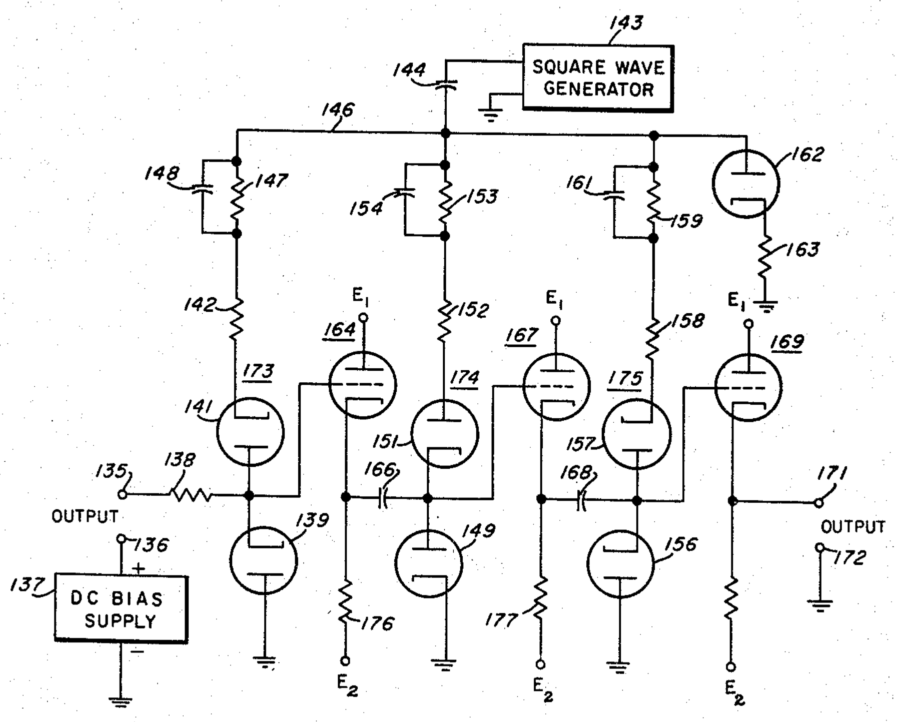

FIG. 6 schematically illustrates a delay line employing diode switches of the type shown in FIG. 5. A D.-C. bias supply 137 is connected between ground and signal input terminal 136. The bias voltage is such that the sum of the impressed signal voltage and the bias voltage is never a negative voltage. Resistor 138 is connected between the junction of series-connected diodes 139 and 141 and input terminal 135. Square-wave generator 143 is A.-C. coupled to electric keying line 146 by means of coupling capacitor 144. Resistors 142 and 147 are series connected between the cathode of diode 141 and line 146. Capacitor 148 is in shunt with resistor 147. Diodes 149 and 151, resistor 152 and resistor 153 are series connected between ground and line 146. Capacitor 154 is connected in parallel with resistor 153. Diodes 156 and 157, resistor 158 and resistor 159 are connected in series between ground and line 146. Capacitor 161 is connected in parallel with resistor 158. Diode 162 and resistor 163 are connected in series between line 146 and ground. Cathode follower 164 is directly coupled to the junction of diodes 139 and 141 and coupled to the junction of diodes 149 and 151 by means of capacitor 166. Cathode follower 167 is directly coupled to the junction of diodes 149 and 151 and coupled to the junction of diodes 156 and 157 by means of coupling capacitor 168. Cathode follower 169 is coupled between the junction of diodes 156 and 157 and output terminal 171. Output terminal 172 is connected to ground. A positive voltage $E_1$ and a negative voltage $E_2$ is applied to each cathode follower from power supplies not shown. Cathode follower 164 functions as a buffer amplifier between diode switches 173 and 174. Similarly cathode follower 167 functions as a buffer amplifier between diode switches 174 and 175. Cathode follower 169 serves as a buffer amplifier between diode switch 175 and the output terminals so that any external load connected to the output terminals will not dissipate the charge on capacitor 168.

Resistors 142, 152 and 158 equalize the currents through diodes switches 173, 174 and 175, respectively, by compensating for differences in the forward resistances of the individual diode pairs. Exact equalization is not required, however, and if the forward resistances of the individual diode pairs differs by less than ten percent, resistors 142, 152 and 158 can be deleted. When semiconductor diodes are used, their low forward resistance permits the equalizing to be accomplished very simply by making resistors 142, 152 and 158 all equal and of a resistance about ten times the maximum expected difference between the forward resistances of the individual diode pairs, for example, if the forward resistance of one pair of diodes totaled 10 ohms while that of another pair was 50 percent higher or 15 ohms, connecting a 50 ohm resistor in series with each pair would produce resistances of 60 and 65 ohms respectively which differ by only about 8.3 percent.

The D.-C. voltage drops across the parallel R-C combinations in series with each diode pair, provide the bias required to prevent the switches dissipating the charges on the sampling capacitors during the switching period. Since the signal sample at each switch is of the right polarity to forward bias its upper diode, the bias voltage required to keep the diode from conducting is the same as the peak signal voltage. The bias resistors, resistors 147, 153 and 159 are selected to give this voltage drop with the average value of the switch current flowing therethrough. The peak-to-peak square-wave voltage required to key the diode switches is twice the sum of the abovementioned bias voltage, the voltage drop across the equalizing resistor and the voltage drop across the diode switch while it is closed.

In operation, with a signal impressed on input terminals 135 and 136, when the square-wave voltage is negative going, an electron current flows from generator 143 through capacitor 144, capacitor 148, resistors 147 and 142 and diode 141. Electrons also flow through resistor 138 and diode 139. The electron flow through diode 141 equals the sum of the electron flow drawn through resistor 138 by the input signal and the flow through diode 139. The electron flow through resistor 138 is practically that which would flow if diode 139 were short circuited. The electron flow through diode 139 need be only sufficient to cause it to operate at a point on its characteristic curve where its dynamic resistance is very low compared to the resistance of resistor 138.

Under these conditions (a negative-going square-wave voltage) switch 173 is closed. If the dynamic resistance of diode 139 is too high and some of the input signal does appear across diode 139, it will be coupled through cathode follower 164 and appear across cathode resistor 176 where it will be in series with the signal presented to cathode follower 167 by the charge on capacitor 166.

Since the signal presented to cathode follower 167 has been phase inverted by the action of the switches while the leakage signal has not, as long as the signal does not change significantly during one sampling period, the effect of the leakage signal appearing across resistor 176 is simply to diminish the amplitude of the signal presented to cathode follower 167.

When the square-wave voltage from generator 143 is positive going, an electron current flows from ground through diode 149, diode 151, resistors 152 and 153, capacitor 154, resistor 153 and capacitor 144 to generator 143. The dynamic resistance of diode 149 is then very low and switch 174 is closed. The electron flow required to charge capacitor 166, during any charging period, will be either into or out of the junction of diodes 149 and 151 depending on whether the positive-voltage sample being stored is larger or smaller than the previous one. If the sample being stored is larger than the previous one, charging of capacitor 166 will result in an increased electron current through diode 149. If the signal sample being stored is smaller than the previous one, an electron current must flow from capacitor 166 into the junction The electronically-switched delay circuits disclosed so far take one sample of the signal for each cycle of the keying signal. The output represents the delay-signal one-half of the time and remains at some reference voltage during the other one-half.

Figure 7:
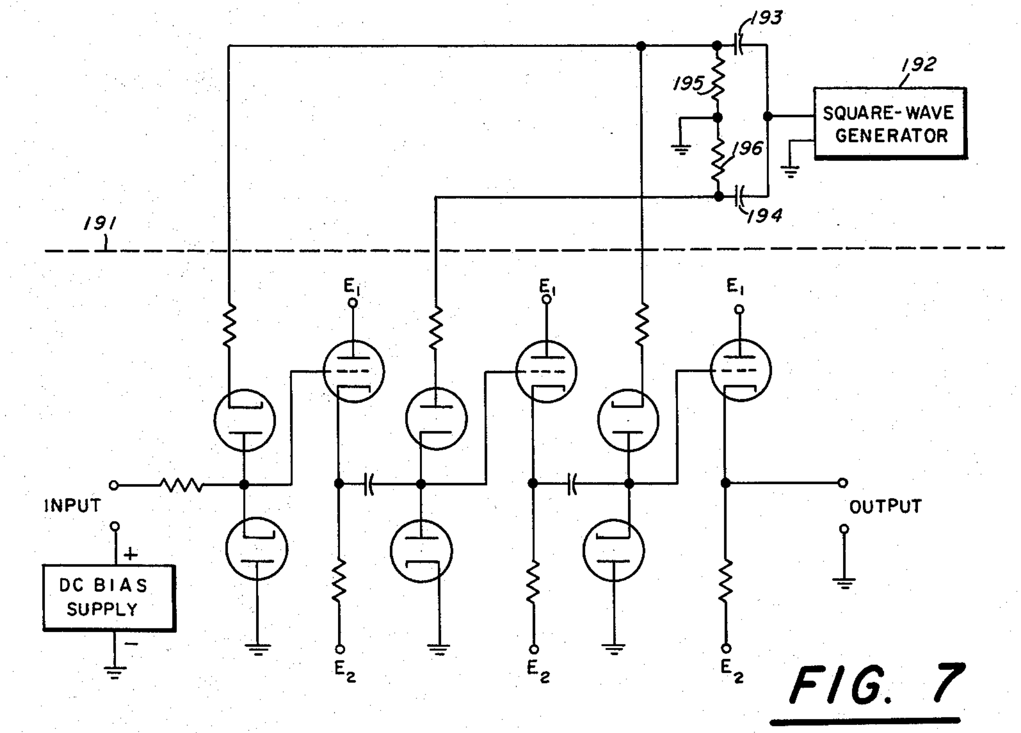
Figure 8:
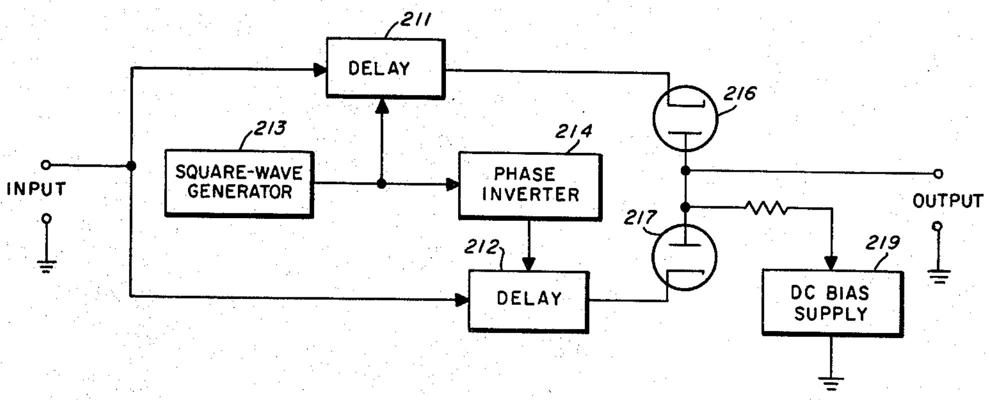

FIG. 8 discloses schematically apparatus for producing a continuous series of delayed signal samples. An input signal is fed simultaneously to delays 211 and 212 which are identical and in accordance with either the delay circuit disclosed in FIG. 6 or FIG. 7. The keying signal for both delays is derived from a common source, square-wave generator 213, however, phase inverter 214 causes the keying signal for delay 212 to be 180 degrees out of phase with the keying signal for delay 211. The outputs of delays 211 and 212 are respectively connected to diodes 216 and 217. The diodes are connected back-to-back and their anodes are biased by bias supply 219. In operation, the output always represents a continuous series of delayed signal samples. Delayed signal samples arrive at the output terminals alternately from the two delays. Diodes 216 and 217 select and pass the delayed signal sample that is above the bias voltage. In addition to producing an output from which the keying waveform is more easily filtered, this arrangement doubles the sampling rate without requiring increased speed from the square-wave generator.

Figure 9:
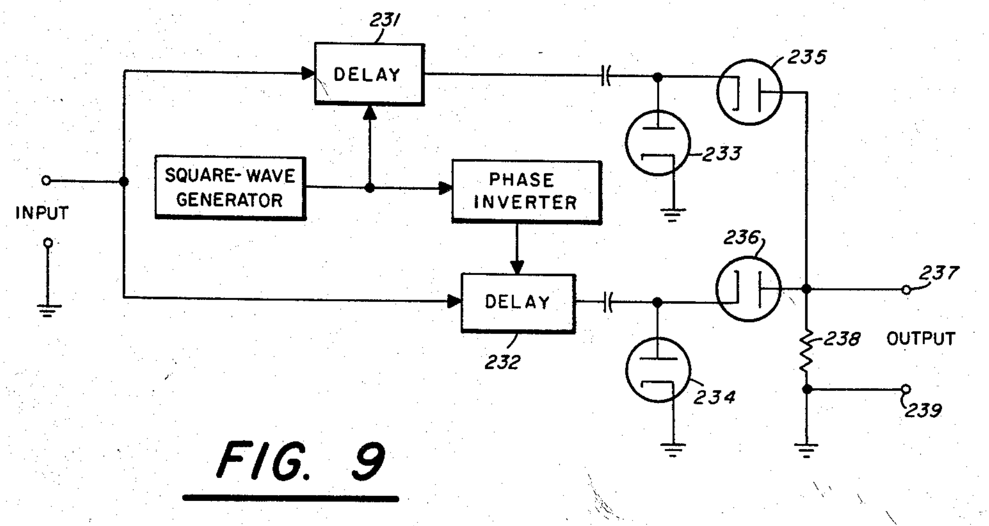

The apparatus in FIG. 9 is similar to that of FIG. 8, but employs a modified output arrangement that eliminates the need for a bias supply. Diodes 233 and 234 shunt the outputs of delays 231 and 232, respectively. Diode 235 is connected between the anode of diode 233 and output terminal 237. Diode 236 is connected between the anode of diode 234 and output terminal 237. Resistor 238 is connected between output terminals 237 and 239.

In operation, diodes 233 and 234 clamp the positive excursions of the delayed signals from the delays to zero volts reference level (ground). Series diodes 235 and 236 function to connect the load resistor 238 to whichever of the outputs is negative, that is, whichever of the two delays whose output represents the delayed input signal. Since it is the reference signal of the output signal which is clamped to ground, the D.-C. level of the system is preserved, that is, the system is, in effect, D.-C. coupled.

FIG. 10 illustrates graphically exemplary waveforms from apparatus in accordance with the invention. A sine-wave input signal is shown for ease of illustration. Any complex wave may be delayed.

Although there has been described above signal delay apparatus in accordance with the invention, it is intended that the specific systems shown in FIGS. 1–4 and 6–9 and described in detail above be exemplary only of the manner in which the principles of the invention may be used to advantage. Accordingly, any and all variations, modifications, or equivalent arrangements falling within the scope of the annexed claims shall be considered to be a part of the invention.

What is claimed is:

1. Apparatus for delaying a signal comprising a first delay line and a second delay line, each of said delay lines comprising a pair of input terminals, a pair of output terminals, and a plurality of signal samplers, said signal samplers comprising a single-throw switch, a buffer amplifier and a storage element, said buffer amplifier being intercoupled between said switch and said storage element, said samplers being coupled in series one to the other and coupled between said input terminals and said output terminals, said input terminals of said delay lines being connected in parallel, a keying-signal generator having an output, a phase inverter having an input and an output, said output of said generator being coupled to all of said switches in said first delay line and to said input of said phase inverter, said output of said phase inverter being coupled to all of said switches in said second delay line, a third pair of output terminals, means coupled to said output terminals of said first and second delay lines and to said third pair of terminals for alternately switching signals from said delay lines to said third pair of terminals so that only one signal is at said third pair of terminals at any one moment.

2. Apparatus in accordance with claim 1 wherein said switches are diode switches and said keying-signal generator is a square-wave generator.

3. Apparatus in accordance with claim 1 wherein said switching means comprises two diodes, a resistor and a bias voltage supply, said diodes each being connected in series with the output of one of said delay lines, said diodes being connected together at their anodes, said resistor being connected in series with said bias supply and said combination being connected between said diode anodes and one of said output terminals of said third pair, and said diode anodes being coupled to another of said output terminals.

4. Apparatus according to claim 1 wherein said switching means comprises first, second, third and fourth diodes, and a resistor, said first diode being coupled between the output terminals of said first delay line, said second diode being connected between said first diode and one of said output terminals of said third pair, said third diode being coupled between said output terminals of said second delay line, said fourth diode being connected between said third diode and said second diode, and said resistor being connected between said third pair output terminals.

5. Apparatus for delaying a signal comprising signal input terminals, means coupled to one of said terminals for biasing said terminal, a plurality of signal samplers each comprising a single-throw switch, a buffer amplifier and a storage element, said amplifier having an input and an output, said switch being connected to said amplifier input, said storage element being connected to said amplifier output, said samplers being connected in series to one another forming a series string having a first sampler and a last sampler, means for coupling said input terminals to said first sampler, signal output terminals, means for coupling said last sampler to said output terminals, a keying-signal generator having an output, biasing means for biasing each switch, said biasing means coupled to said generator output and said switches.

6. Apparatus according to claim 5 wherein said biasing means comprises a plurality of resistors equal to the number of said switches, a like plurality of capacitors, each resistor being connected in parallel with one of said capacitors to form a plurality of resistor-capacitor combinations, and one of said resistor-capacitor combinations connected between each switch and the output of said generator.

7. Apparatus in accordance with claim 5 wherein said biasing means comprises first and second resistors and first and second capacitors, said resistors each having first and second ends, said capacitors each having first and second ends, said first ends of said resistors being connected together, said first ends of said capacitors being connected together, said second end of said first resistor being connected to said second end of said first capacitor, said second end of said second resistor being connected to said second end of said second capacitor, said output of said generator being connected to said first ends of said first and second capacitors, all odd-numbered switches in said series string being coupled to said second end of said first resistor, all even-numbered switches in said series string being coupled to said second end of said second resistor.

8. Apparatus for delaying a signal comprising first and second delay lines, each of said delay lines comprising signal input terminals, means coupled to one of said terminals for biasing said terminal, a plurality of signal samplers each comprising a single-throw switch, an amplifier having an input and an output, and a storage element, said switch being connected to said input of said amplifier, said storage element being connected to said amplifier output, said samplers being connected in series so as to form a of diodes 149 and 151. The electron flow through diode 151 is primarily limited by the resistance of resistor 152. The electron flow through diode 151 must be at least as great as the sum of the maximum charging current demanded by capacitor 166 and that required to maintain the dynamic resistance of diode 149 low. Excessively high dynamic resistance in diode 149 will permit the sample which is being put in capacitor 166 to appear across cathode resistor 177, where it will be subtracted from the signal already at cathode follower 167, and also will slow down the charging of capacitor 166.

Switches 173 and 175 operate in unison and switch from one state to another alternately with switch 174. As stated above, the switching rate is determined by the frequency of the square-wave voltage. The switching frequency is made slightly higher than the maximum frequency component in the input signal to preserve the fidelity of the input signal. The apparatus functions in the same manner as the apparatus disclosed in FIG. 4. The input signal impressed on input terminals 135 and 136 is sampled first by capacitor 166 and then that sample is passed on to capacitor 168 and output terminals 171 and 172. Although for purposes of illustrating the signal delay technique only three switches are shown in FIG. 6, it should be appreciated that the total number of switches and sampling capacitors can be varied to produce any desired delay.

An odd number of diode switches are employed in the apparatus of FIG. 6. The resistor 163 and diode 162 are employed to equalize the positive and negative currents through capacitor 144 so that no D.-C. voltage is built up on the keying line 146. A D.-C. voltage on this line would decrease the back bias across one-half of the switches, and the forward current through the other one-half. If present to an extreme degree, this condition could cause limiting of signal peaks. A resistor-diode combination should be employed whenever an odd number of diode switches are used, but a careful balancing of the currents through the square-wave generator coupling capacitor is not necessary.

The time elapsed between the receipt of a signal sample by a capacitor, and its delivery to the next one, is one-half the time required for one complete cycle of the switch, that is, the delay per storage capacitor is just one-half the period of the switch repetition rate. This does not apply to the first capacitor since it charges to the value of the signal existing at the end, rather than the beginning, of its charging period, and hence, should be thought of as producing no delay. More concisely then, the delay at any point in the circuit relative to the input terminals is $$T_d=P/2(n-1)$$

where $T_d$ is the total delay, P is the repetition period of the switch and $n$ is the number of storage capacitors through which the sample has passed. The signal is inverted as it passes through each capacitor, but, of course, this may not be construed as being a delay.

The input and output characteristics suitable for the buffer amplifiers disclosed in FIG. 6 as well as FIGS. 3 and 4 may be closely approximated as follows where:

$E$=signal voltage input=signal voltage output
$T_s$=the time the sample is held in the capacitor
$T_c$=the time required to charge the capacitor to practically the full signal voltage
$C$=capacity of storage capacitor
$E_d$=the voltage drop of sample during storage due to leakage
$\alpha=E_d/E$=the fractional loss of the sample voltage during storage period
$I_c$=capacitor charging current=amplifier output current (assumed constant during charging period)
$I_d$=capacitor discharge current (assumed equal to amplifier input current)
$\beta=T_c/T_s$=the fraction of one charging period allowed for capacitor to reach practically full charge.

From the general relation for the constant-current charging of a capacitor $Q=ce=It$, where Q is the total charge on the capacitor, $e$ is the voltage across the capacitor, and $c$ is the capacitance of the capacitor, and assuming the amplifier output current is constant during the charging period, $T_c$, then $$E=I_cT_c/C$$
$$=I_c\beta T_s/C$$

Likewise, if the leakage current is constant (or at least to the extent that it is constant) during the storage period, $T_s$, $$E_d=I_dT_s/C=\alpha E$$

Combining equations then $$T_s/C=E/\beta I_c=\frac{\alpha E}{I_d}$$

and $$I_d/I_c=\alpha\beta$$

By definition, $E/I_c=R_o$=output resistance of the amplifier, and
$E/I_dR_i$=amplifier input resistance (including all of the parallel leakage paths across C).

Combining the above equations, then $$R_o/\beta=\alpha R_i$$

or $$R_o=\alpha BR_i$$

The value of C for a given sampling rate is also given by the above as, $$T_s/c=\alpha E/I_d=\alpha R_i$$

or $$C=T_s/\alpha R_i$$

Since the voltage at any point on a given exponential decay curve is a linear function of the initial voltage, leakage paths in parallel with the storage capacitor will result in amplitude non-linearity. This attenuation for one delay unit is, $$A=\frac{E-E_d}{E}=1-E_d/E=1-\alpha$$

and, of course, for $n$ delay units it is, $$A_n=(1-\alpha)^n$$

FIG. 7 illustrates delay apparatus that is similar to that of FIG. 6 except for a simplified biasing circuit. The components below broken line 191 in FIG. 7 are the same components employed in FIG. 6 and they cooperate in the same manner. Square wave generator 192 is connected to capacitors 193 and 194. Series-connected resistors 195 and 196 are connected between the other ends of capacitors 193 and 194. The junction of resistors 195 and 196 is grounded. The first and third diode switches are connected to resistor 195 and capacitor 193, while the second diode switch is connected to resistor 196 and capacitor 194. All the bias resistors for the odd-numbered diode switches are combined into one resistor, resistor 195. The bias resistor for the even-numbered switch (and any additional even-numbered switches that may be employed) is resistor 196. The bias filtering is performed by capacitors 194 and 193. With this arrangement, the bias required to keep the diodes non-conducting, is still equal to the peak signal voltage. The keying voltage, the voltage from square-wave generator 192, is made to swing each side of zero an amount equal to the bias plus the voltage drops across the equalizing resistor and the series-connected diodes. Therefore, the peak-to-peak keying voltage required is the same as required in the apparatus of FIG. 6. Since the current through resistors 195 and 196 is the sum of the average currents through the switches which they bias, and the required bias has already been disclosed, the resistances of these resistors may be computed by use of Ohm's law.

chain of samplers, said chain having a first sampler and a last sampler, said input terminals of said delay lines being connected in parallel, a keying-signal generator having an output, a phase inverter having an input and an output, said output of said generator being coupled to said inverter input and to all of said switches in said first delay line, said output of said inverter being coupled to all of said switches in said second delay line, signal output terminals, means coupled to said last samplers of said delay lines and to said signal output terminals for alternately switching said output terminals to said last samplers.

9. Apparatus in accordance with claim 8 wherein said switches in said delay lines are diode switches and said keying signal generator is a square-wave generator.

10. Apparatus in accordance with claim 8 wherein said signal output terminals comprise first and second terminals, said switching means comprises first, second, third and fourth diodes and a resistor, said first diode being coupled between said last sampler in said first delay line and said first terminal, said resistor being coupled between said last sampler in said first delay line and said second terminal, said third diode being coupled between said last sampler in said second delay line and said first terminal, said fourth diode being coupled between said last sampler of said second delay line and said second terminal, and said resistor being connected between said first and second terminals.

11. Apparatus in accordance with claim 8 wherein said switching means comprises first and second diodes, a resistor and a bias supply, said signal output terminals comprise first and second terminals, said first diode being connected between said last sampler of said first delay line and said first terminal, said second diode being connected between said last sampler of said second delay line and said first terminal, said resistor and bias supply being connected in series and between said first and second terminals.

12. Apparatus for delaying a signal comprising first and second delay lines, each of said delay lines comprising signal input terminals, means coupled to one of said terminals for biasing said terminal, a plurality of signal samplers each comprising a single-throw switch, an amplifier having an input and an output, and a storage element, said switch being connected to said input of said amplifier, said storage element being connected to said amplifier output, said samplers being connected in series so as to form a chain of samplers, said chain having a first sampler and a last sampler, said input terminals of said delay lines being connected in parallel, a keying-signal generator having an output, a phase inverter having an input and an output, said output of said generator being coupled to said inverter input and to all of said switches in said first delay line, said output of said inverter being coupled to all of said switches in said second delay line, signal output terminals, means coupled to said last samplers of said delay lines and to said signal output terminals for alternately closing electric paths from said last samplers to said output terminals, said alternations having the same frequency as the frequency of said generator.

References Cited by the Examiner

UNITED STATES PATENTS

| | | | |
|---|---|---|---|
| 2,912,576 | 11/59 | Bacher | 307—88.5 |
| 2,921,738 | 1/60 | Greening | 328—37 |
| 2,981,890 | 4/61 | Ruehlemann | 328—78 |
| 3,011,129 | 11/61 | Magleby et al. | 307—88.5 |
| 3,026,422 | 3/62 | Phylip-Jones | 307—88.5 |
| 3,047,807 | 7/62 | Langan | 328—78 |

ARTHUR GAUSS, *Primary Examiner.*

JOHN W. HUCKERT, *Examiner.*